(12) United States Patent
Mahoney et al.

(10) Patent No.: US 6,599,489 B2
(45) Date of Patent: Jul. 29, 2003

(54) ALUMINUM TRIHYDRATE CRYSTALS AND IMPROVED METHOD FOR THE PRODUCTION THEREOF

(75) Inventors: Robert P. Mahoney, Warrenville, IL (US); William B. Schnieders, Jr., Corpus Christi, TX (US)

(73) Assignee: Ondeo Nalco Company, Naperville, IL (US)

( * ) Notice: Subject to any disclaimer, the term of this patent is extended or adjusted under 35 U.S.C. 154(b) by 0 days.

(21) Appl. No.: 09/824,137

(22) Filed: Apr. 2, 2001

(65) Prior Publication Data

US 2002/0159936 A1 Oct. 31, 2002

Related U.S. Application Data

(63) Continuation-in-part of application No. 07/990,658, filed on Dec. 14, 1992, now abandoned.

(51) Int. Cl.$^7$ .................................................. C01F 7/00
(52) U.S. Cl. ...................................... 423/121; 423/122
(58) Field of Search ................................ 423/121, 122; 210/734, 735

(56) References Cited

U.S. PATENT DOCUMENTS

| | | | |
|---|---|---|---|
| 3,345,344 A | 10/1967 | Fetscher et al. | |
| 4,480,067 A | 10/1984 | Vio et al. | |
| 4,532,046 A | 7/1985 | Meunier et al. | |
| 4,536,296 A | 8/1985 | Vio | |
| 4,587,306 A | 5/1986 | Vio et al. | |
| 4,608,237 A | 8/1986 | Roe et al. | |
| 4,737,352 A | 4/1988 | Owen et al. | |
| 4,767,540 A | 8/1988 | Spitzer et al. | |
| 5,093,091 A | 3/1992 | Dauplaise et al. | |
| 5,217,620 A | * 6/1993 | Mahoney et al. | 423/121 |
| 5,601,726 A | * 2/1997 | Cole | 423/121 |
| 5,665,244 A | * 9/1997 | Rothenberg et al. | 423/121 |
| 5,853,677 A | * 12/1998 | Avotins et al. | 423/121 |
| 5,951,955 A | * 9/1999 | Flieg et al. | 423/121 |

FOREIGN PATENT DOCUMENTS

| | | | |
|---|---|---|---|
| EP | 602900 | * | 3/1997 |
| GB | 2270519 | * | 3/1994 |

OTHER PUBLICATIONS

D.P. Spitzer, A.S. Rothenberg, H.I. Heitner, M.E. Lewellyn, L.H. Laviolette, T. Foster, and P.V. Avotins, "Development of New Bayer Process Flocculants", Light Metals 1991, pp. 167–171, no month.

R.C. Emmett, T.J. Laros, K.A. Paulson, "Recent Developments in Solid/Liquid Separation Technology in the Alumina Industry", Light Metals 1992, pp. 87–90, no month.

* cited by examiner

*Primary Examiner*—Steven Bos
(74) *Attorney, Agent, or Firm*—Margaret M. Brumm; Thomas M. Breininger

(57) ABSTRACT

The present invention provides an improved process for the production of alumina trihydrate crystals. Through the addition of a hydroxamated polymer at various stages of the process for production of these alumina trihydrate crystals, an upward shift in the particle size distribution of the alumina trihydrate crystals occurs. In one embodiment, the hydroxamated polymer is added to a filtered aqueous solution, which comprises no more than about 10 mg of insoluble solids per liter. In another embodiment, the hydroxamated polymer is added to an aqueous solution comprising insoluble solids after precipitation of alumina trihydrate crystals has commenced. Optionally, alumina trihydrate seed crystals may be added to the aqueous solution to initiate or encourage crystal formation.

23 Claims, No Drawings

ALUMINUM TRIHYDRATE CRYSTALS AND IMPROVED METHOD FOR THE PRODUCTION THEREOF

CROSS-REFERENCE TO RELATED APPLICATION

This application is a continuation-in-part of U.S. patent application Ser. No. 07/990658, filed Dec. 14, 1992, now abandoned, entitled "Trihydrate Crystal Modifier for the Bayer Process," by Robert P. Mahoney et. al.

TECHNICAL FIELD OF THE INVENTION

The present invention is in the technical field of alumina trihydrate crystal formation, that is, the nucleation and growth of alumina trihydrate crystals, in the Bayer process for the recovery of alumina from bauxite ore.

BACKGROUND OF THE INVENTION

In the typical Bayer process for the production of alumina, bauxite ore is pulverized, slurried in water, and then digested with caustic at elevated temperatures and pressures. The caustic solution dissolves oxides of aluminum, forming an aqueous sodium aluminate solution. The caustic-insoluble constituents of bauxite ore are then separated from the aqueous phase containing the dissolved sodium aluminate. Solid alumina trihydrate product is precipitated out of the solution and collected as product.

The Bayer process is constantly evolving and the specific techniques employed in industry for the various steps of the process not only vary from plant to plant, but also are often held as trade secrets. As a more detailed, but not comprehensive, example of a Bayer process, the pulverized bauxite ore may be fed to a slurry mixer where a water slurry is prepared. The slurry makeup water is typically spent liquor (described below) and added caustic. This bauxite ore slurry is then diluted and passed through a digester or a series of digesters where about 98% of the total available alumina is released from the ore as caustic-soluble sodium aluminate. The digested slurry is then cooled, for instance to about 230° F., employing a series of flash tanks wherein heat and condensate are recovered. The aluminate liquor leaving the flashing operation often contains from about 1 to about 20 weight percent solids, which solids consist of the insoluble residue that remains after, or is precipitated during, digestion. The coarser solid particles may be removed from the aluminate liquor with a "sand trap" cyclone or other means. The finer solid particles may be separated from the liquor first by settling and then by filtration, if necessary. For instance, the slurry of aluminate liquor and finer solids may be first fed to the center well of a mud settler, or primary settler, and as the mud settles (which settling can be enhanced by the presence of a flocculant) clarified sodium aluminate solution, referred to as "green" or "pregnant" liquor, overflows a weir at the top. This overflow from the mud settling tank is passed to the subsequent process steps. If the aluminate liquor overflowing the settler contains an unacceptable concentration of suspended solids (at times from about 50 to about 500 mg of suspended solids per liter), it would then generally be further clarified by filtration to give a filtrate with no more than about 10 mg suspended solids per liter of liquor. The treatment of the liquor collected after the primary settlement to remove any residual suspended solids before alumina trihydrate is recovered is referred to as a secondary clarification stage. In another section of such a Bayer circuit, the settled solids of the primary settler ("red mud") may be withdrawn from the bottom of the settler and passed through a countercurrent washing circuit for recovery of sodium aluminate and soda.

The Bayer process can vary from plant to plant as to both minor modifications and/or as to major process techniques. For instance, not all Bayer process plants use primary settlers or even mud washers. Some plants send the digester blow-off slurry directly to red mud filters, and the filtrate liquor is the green liquor of a typical Bayer process.

The present process generally is independent of the method of red mud separation. The characteristic qualities of the clarified liquors will remain within a reasonable range, and not so different as to become unresponsive to the present process.

The clarified sodium aluminate liquor is usually seeded with alumina trihydrate crystals to induce precipitation of alumina in the form of alumina trihydrate, $Al(OH)_3$. The alumina trihydrate particles or crystals are then separated from the concentrated caustic liquor, and the remaining liquid phase, the spent liquor, is returned to the initial digestion step and employed as a digestant after reconstitution with caustic.

The clarified sodium aluminate liquor (which may be the overflow from primary settler or the supernatant), also referred to as "green liquor", is a hot caustic liquor, generally containing the highest values of dissolved sodium aluminate. Sodium aluminate-containing liquor is kept at elevated temperatures during the beneficiation steps so as to retain its high values of dissolved sodium aluminate. It is charged to a suitable precipitation tank, or series of precipitation tanks, and almost always seeded with recirculated fine particle alumina trihydrate crystals. In the precipitation tank(s) it is cooled under agitation to induce the precipitation of alumina from solution as alumina trihydrate. The fine particle alumina trihydrate crystal seeds act as crystal nucleation sites for this precipitation process.

Alumina trihydrate crystal formation (the nucleation and growth of alumina trihydrate crystals), and the precipitation and collection thereof, are critical steps in the economic recovery of aluminum values by the Bayer process. Bayer process operators strive to optimize their crystal formation and precipitation methods so as to produce the greatest possible product yield from the Bayer process while producing crystals of a given particle size distribution. A relatively large particle size is beneficial to subsequent processing steps required to recover aluminum metal. Undersized alumina trihydrate crystals, or fines, generally are not used in the production of aluminum metal, but instead are recycled for use as fine particle alumina trihydrate crystal seed. If too much of the overall product yield is formed as fines, the production rate of alumina trihydrate crystals usable for aluminum metal production is diminished, the seed/product production balance is skewed, and the fraction of the overall product yield that is of sufficient particle size to be used for aluminum metal production routinely will still suffer from a less than optimum particle size distribution for the electrolytic production of aluminum metal.

After formation, the alumina trihydrate particles or crystals are separated from the concentrated caustic liquor, and the remaining liquid phase (the spent liquor) is returned to the initial digestion step and employed as a digestant after reconstitution with caustic. This separation or recovery of alumina trihydrate as product in the Bayer process, or for use as precipitation seed, is generally achieved by settling and/or filtration. Coarse particles settle easily, but fine particles settle slowly and to some extent are lost product or, if recovered by filtration, blind the filters. Thus another reason it is desirable to limit the formation of alumina trihydrate fines is to improve the subsequent step(s) directed to the separation of alumina trihydrate crystals from the spent liquor.

U.S. Pat. No. 4,608,237, August 1986, Roe et al., uses an acrylic acid containing polymer, added to the pregnant liquor of a Bayer process immediately prior to crystallization of alumina trihydrate, to reduce the percent alumina trihydrate crystals smaller than 200 microns in diameter. U.S. Pat. No. 4,737,352, April 1988, Owen et al., uses a surfactant/oil blend, added to the pregnant liquor of a Bayer process immediately prior to crystallization of alumina trihydrate, to increase the percent alumina trihydrate crystals coarser than −325 mesh.

It is an object of the present invention to provide an upward shift in the particle size distribution of alumina trihydrate crystals formed in the Bayer process. It is an object of the present invention to reduce the percent of alumina trihydrate crystal fines formed in the Bayer process. It is an object of the present invention to provide an upward shift in the particle size distribution of alumina trihydrate crystals formed in the Bayer process substantially without any decrease in the overall product yield. It is an object of the present invention to reduce the percent of alumina trihydrate crystal fines formed in the Bayer process substantially without any decrease in the overall product yield and thereby improve the separation and collection of alumina trihydrate crystals. It is an object of the present invention to reduce the percent of alumina trihydrate crystal fines formed in the Bayer process substantially without any decrease in the overall product yield and thereby increase the yield of alumina trihydrate crystals of optimal particle size for aluminum metal production. It is an object of the present invention to provide a more effective Bayer process wherein the yield of coarser alumina trihydrate particles is increased and the separation and collection of alumina trihydrate from the alkaline liquor is improved. These and other objects of the present invention are described in more detail below.

DISCLOSURE OF THE INVENTION

The present invention provides a method comprising adding to a Bayer process clarified pregnant aluminate liquor a water-soluble anionic hydroxamated polymer in an amount effective to upwardly shift the particle size distribution of the alumina trihydrate crystals formed. The present invention provides an improved Bayer process wherein the percent of alumina trihydrate crystal fines formed is reduced by adding a water-soluble anionic hydroxamated polymer to a Bayer process clarified pregnant aluminate liquor in an amount effective to reduce the fines produced upon formation of alumina trihydrate crystals. These and other embodiments of the invention are described in more detail below.

PREFERRED EMBODIMENT OF THE INVENTION

In the Bayer process, after primary settlement and secondary clarification the concentrated alumina liquor (a supersaturated solution) is cooled, almost always with seeding with alumina trihydrate crystals, to induce precipitation of alumina trihydrate crystalline particles. Relatively large particle sized alumina trihydrate particles are generally beneficial to subsequent processing steps required to recover aluminum metal, while very small alumina trihydrate crystals, or fines, are recycled for use as fine particle alumina trihydrate crystal seed. The higher the fraction of the overall product yield that is formed as fines, the lower is the production rate of alumina trihydrate crystals usable for aluminum metal production. When a high fraction of the overall product yield is formed as fines, the product that is of sufficient particle size to be used for aluminum metal production routinely will still suffer from a less than optimum particle size distribution for the electrolytic production of aluminum metal. Further, the precipitated alumina trihydrate may be difficult to separate from the concentrated caustic liquor if too much fines are produced. The finer crystalline material tends to settle slowly and gives poor supernatant clarities, which result in product losses. In addition, where recovery of the precipitation includes a filtration step, fine material causes filter blinding.

The addition of the hydroxamated polymer improves the formation of alumina trihydrate crystals. It provides an upward shift in the particle size distribution of alumina trihydrate crystals formed in the Bayer process and reduces the percent of alumina trihydrate crystal fines formed in the Bayer process. The use of the hydroxamated polymer as a crystal modifier in the Bayer process provides an upward shift in the particle size distribution of alumina trihydrate crystals formed substantially without any concomitant decrease in the overall product yield. It thereby improves the separation and collection of alumina trihydrate crystals. The addition of the hydroxamated polymer to the Bayer process clarified pregnant aluminate liquor reduces the percent of alumina trihydrate crystal fines formed in the Bayer process substantially without any decrease in the overall product yield and thereby increases the yield of alumina trihydrate crystals of optimal particle size for aluminum metal production. It provides a more effective Bayer process wherein the yield of coarser alumina trihydrate particles is increased, and the separation and collection of alumina trihydrate from the alkaline liquor is improved. It is believed that the formation of coarser alumina trihydrate particles will also improve the subsequent supernatant filtration by reducing filter blinding, or eliminate the need for such subsequent supernatant filtration. It is also believed that the hydroxamated polymer crystal modifier will improve the alumina-caustic liquor separation on a vacuum filter by forming a more porous filter cake containing a lower percentage of fine solids. When a more porous filter cake is formed, the yield or production of the dried solids from vacuum filtration is increased.

The liquor from which the alumina trihydrate crystals are to be precipitated in a commercial Bayer process is, as noted above, at times referred to as the green liquor, or pregnant liquor, or alumina trihydrate precipitation feed. The alumina trihydrate precipitation feed is the pregnant liquor as fed to the Bayer circuit station at which the alumina trihydrate crystals will be formed. In a broader sense, it is an aqueous, alkaline sodium aluminate solution, that typically is both hot and supersaturated. It contains substantially little to no insoluble residues prior to crystallization of alumina trihydrate, such solids having been substantially removed during primary and secondary clarification. As used herein, the terminology of clarified pregnant liquor and/or clarified sodium aluminate liquor refers to the Bayer process liquor not only in its state as alumina trihydrate precipitation feed, but also in its state during precipitation of alumina trihydrate.

The conditions under which the pregnant liquor is seeded and/or cooled to induce precipitation of the alumina trihydrate particles are known to vary widely among commercial Bayer process installations, although the precise conditions and combination of conditions are generally proprietary information. The variable process conditions include temperature profiles, including not only the temperature at the time precipitation is initiated, but also the drop in temperature over the crystal formation period, the amount and particle size distribution of the seed crystals charged, both factors in the seed crystal surface area that is present, the typical concentrations of sodium aluminate in the feed (the liquor loading), the purity of the precipitation feed liquor and the species of impurities typically present therein, and the like. The deleterious effect of dissolved sodium oxalate on trihydrate crystal formation, leading to an undesirably high fraction of fines, is described in U.S. Pat. No. 4,608,237, August 1986, Roe et al., and U.S. Pat. No. 4,737,352, April 1988, Owen et al., hereby incorporated hereinto by reference.

The alumina trihydrate precipitate is usually recovered after settlement by filtration of the settled phase after supernatant removal, although it may be subjected to settlement alone with removal of the supernatant. The recovered trihydrate crystals may then be treated by the usual processes, including calcination, which drives off the water and is sufficient to burn off any organic residues, including the residues of the hydroxamated polymer. The supernatant (spent liquor) is recycled in the conventional manner to the digestion stage.

A commercial alumina trihydrate precipitation feed is most commonly a caustic liquor having a pH from about 10 to about 14, or higher, a temperature between about 104° F. and about 190° F. (from about 40° C. to about 88° C.), or higher, and a dissolved aluminate content, as $Al_2O_3$, of from about 55 to about 300 grams per liter of the precipitation feed solution.

The alumina trihydrate precipitation feed may have a concentration of dissolved organic components up to about 50 g/liter of solution, and such a solution typically has a concentration of dissolved organic components in the range of from about 0.1 to about 5 or 10 g/liter of solution. The caustic insoluble solids (not including the alumina trihydrate precipitate that may have already formed) content of the alumina trihydrate precipitation feed before seeding generally is no more than about 50 mg (0.05 grams) per liter of solution, and seldom exceeds the amount of about 10 mg per liter of solution.

The alkalinity of the alumina trihydrate precipitation feed can range from about 5 to about 400 g/liter of solution, expressed as sodium carbonate. The alkalinity of alumina trihydrate precipitation feeds typically are in the range of from about 50 to about 400 g/liter of solution expressed as sodium carbonate, and often are within the range of from about 200 to about 400 g/liter of solution expressed as sodium carbonate.

The addition of the hydroxamated polymer is made after the separation of red mud from the supersaturated liquor has been completed and preferably before at least a significant portion of the alumina trihydrate seed crystals have been charged to the liquor, but it is possible to add it after the alumina trihydrate seed crystals have been added and after precipitation has commenced.

The hydroxamated polymer should be added to the clarified pregnant liquor in an amount effective to upwardly shift the particle size of the alumina trihydrate crystals formed, and at least reduce the percent of fines, for instance the particles that pass through a 325 mesh screen, in the overall product yield. By overall product yield is meant herein the total yield of solids without segregation by particle size or by any other parameter. For purposes of this definition, the total solids are the washed and dried filter cake remaining upon vacuum filtration through a 0.45 micron filter paper. A shift in particle size distribution is, of course, determined in comparison to particle size distribution produced using the same process parameters in the absence of the hydroxamated polymer. In preferred embodiment, the hydroxamated polymer is added to the clarified pregnant liquor in an amount effective to upwardly shift the particle size of the alumina trihydrate crystals formed, and reduce both the percent of fines that pass through a 325 mesh screen and the percent of fines that pass through for instance a 200 mesh screen, in the overall product yield. In another preferred embodiment, the hydroxamated polymer is added to the clarified pregnant liquor in an amount effective to upwardly shift the particle size of the alumina trihydrate crystals formed without substantially any decrease in the overall product yield.

The effective amount of hydroxamated polymer can depend upon the concentration of aluminate in the solution, other solution conditions, other crystal formation process parameters, and the hydroxamated polymer's anionic charge density and molecular weight. The amount of the hydroxamated polymer added is usually in the range of from about 0.01 to about 20 mg/liter of solution, preferably from about 0.05 to about 15 mg/liter of solution, and more preferably from about 0.1 to about 8, or 10, mg/liter of solution. Commonly less than about 5 mg/liter of solution of polymer can be used.

The effective amount of hydroxamated polymer can be from about 0.05 to about 125 parts by weight of hydroxamated polymer per million parts by weight of aluminate, as $Al_2O_3$, in the solution ("ppm"), and in more preferred embodiment from about 0.5 to about 80 ppm, and in even more preferred embodiment from about 1 to about 40, or 50, ppm. About 40 ppm is the maximum needed under most conditions; and more than 60 ppm will often be unnecessary.

The hydoxamic polymer should be sufficiently stable under the process conditions used, the temperatures and caustic conditions described above.

Any water soluble hydroxamic polymer may be used, but the hydroxamic polymer is commonly a polymer containing mer units with hydroxamic acid or salt pendant groups of the Formula I Formula I

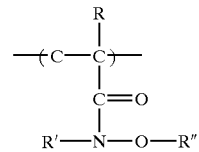

wherein R is hydrogen or a substituent to carbon other than hydrogen, for instance a lower alkyl such as methyl, and R' and R" are independently hydrogen, a cation or another substituent, for instance a lower alkyl such as methyl, ethyl, propyl and the like.

The hydroxamic polymers, or hydroxamated polymers, are well known in the art and can be prepared by post-polymerization derivatization from polymers containing pendant reactive groups, such as pendant ester groups, pendant amide groups, pendant anhydride groups, pendant nitrile groups and the like by the reaction thereof with hydroxylamine or its salt at a temperature within the range of from about 20° C. to about 100° C. for several hours. From about 1 to about 90 mole percent of the available pendant reactive groups of the precursor polymer may be replaced by hydroxamic groups in accordance with such procedures. Such post-polymerization derivatization may be carried out in a polymer solution or in a polymer-containing latex, including both water-continuous latices and water-in-oil latices (wherein the polymer is substantially associated with the dispersed aqueous phase). When two or more species of pendant reactive groups are present in the precursor polymer, the reaction with hydroxylamine may favor one or more of such species over the other(s). The molecular weight of the hydroxamated polymer is dependent upon the molecular weight of the precursor polymer. Hydroxamic acid or salt-containing polymers of very high molecular weights can be prepared by using a water-in-oil latex of, for example, polyacrylamide or copolymers of acrylamide with acrylic acid or other suitable comonomers.

Exemplary of the polymers which may be hydroxamated for use in the present process include acrylic acid ester polymers, methacrylic acid ester polymers, crotonic acid ester polymers, and the like carboxylic acid ester polymers, such as polymers produced from the polymerization of methyl (meth)acrylate, ethyl (meth)acrylate, t-butyl (meth)acrylate, cyclohexyl (meth)acrylate, dimethyl aminoethyl (meth)acrylate, dimethyl aminoethyl (meth)acrylate, methyl crotonate, and the like type of carboxylic acid ester containing mer units, generally wherein the ester moiety is derived from a $C_{1-12}$ alcohol, and preferably wherein the ester moiety is derived from a $C_{1-6}$ alcohol. The polymers which may be hydroxamated for use in the present process also include polymers of maleic anhydride and esters thereof, pendant nitrile containing polymers such as those produced from acrylonitrile, pendant amide containing polymers such as those produced from acrylamide, methacrylamide and the like. The hydroxamic acid or salt-containing polymer may be derived from homopolymers, copolymers, terpolymers, or polymers of more varied mer units. Hydroxamic polymers are well known to those of ordinary skill in the art and are specifically disclosed, together with methods for their preparation, in U.S. Pat. Nos. 3,345,344, 4,480,067, 4,532,046, 4,536,296, and 4,587,306, and U.K. Patent Application 2171127, hereby incorporated hereinto by reference. Suitable hydroxylamine salts include the sulfate, sulfite, phosphate, perchlorate, hydrochloride, acetate, propionate, and the like.

The hydroxamic acid or salt-containing polymer for use in the present process should generally have a weight average molecular weight within the range of from about 10,000 to about 50,000,000. The hydroxamated polymer preferably has a weight average molecular weight of at least about 1 million, preferably with an IV of from about 5 to about 40 dl/g.

The degree of hydroxamation, that is, the concentration of mer units (polymer segments containing two adjacent backbone carbons) of the Formula I above, may vary from about 1 to about 90 mole percent, and preferably is within the range of from about 5 to about 75 mole percent, and most preferably from about 10 to about 50 mole percent.

Since the clarified pregnant liquor is alkaline, the hydroxamated polymer in preferred embodiment is predominantly anionic, although it can also contain nonionic or even a minor amount of cationic mer units, provided that the amount of any such cationic mer units is sufficiently small so that the polymer retains an overall anionic nature and its water solubility. The anionic mers other than the hydroxamic mer units (referred to herein as the "non-hydroxamic anionic mer units" unless expressly indicated otherwise) are generally carboxylic acids or sulphonic acids, and are usually derived from acrylic acid (AA) but can be derived from methacrylic acid (MAA) or a sulfoalkyl acrylamide, such as 2-sulfopropylacrylamide, or the other anionic monomers noted above. The hydroxamated polymer generally is comprised of from about 1 to about 99 mole percent, and preferably from about 15 to 90 mole percent, non-hydroxamic anionic mer units with the balance being hydroxamic mer units, optionally together with nonionic mer units. More preferably the hydroxamated polymer is comprised of from about 25 to about 75 mole percent non-hydroxamic anionic mer units, the balance being hydroxamic mer units, optionally together with nonionic mer units. In an even more preferred embodiment, the hydroxamated polymer is comprised of from about 25 to about 75 mole percent non-hydroxamic anionic mer units, from about 10 to about 40 mole percent hydroxamic mer units and from about 10 to about 40 mole percent nonionic mer units.

The nonionic mer units are usually the polar (meth) acrylamide mer units (AcAm or methAcAm), but others may be used, for instance, mer units derived from vinyl acetate, vinyl pyrrolidone, butadiene, styrene, alkanolacrylamides such as methylol acrylamide and others.

Test Method

The test method employed for evaluating Bayer process trihydrate crystal formation with and without an alumina trihydrate crystal modifier is as follows. A quantity of hot pregnant liquor sufficient for the desired number of comparative test runs is obtained fresh from a commercial Bayer circuit, and for each test run a 800 ml sample thereof ("test sample") is charged to a 1000 ml plastic bottle. The test samples are then dosed with the trihydrate crystal modifier being used, if any, and mixed well. The pregnant liquor of each test sample is then seeded with hydrated alumina seed at a dosage of 43.6 grams of the alumina trihydrate crystal seed per liter of the pregnant liquor, and each bottle is mixed well. The test sample bottles are then agitated on a rotating rack in a 70° C. constant temperature bath for a time period of 24 hours. All test sample bottles in a comparative series are placed on the rack in such constant temperature bath at about the same time, and while the test samples are still hot. At the end of the 24 hour period, each test sample is filtered to separate the alumina trihydrate precipitate that has formed from the "spent liquor" filtrate. If analysis of the spent liquor is desired, a sample of the filtrate prior to any washing of the filter cake is taken. Each filter cake is then washed with a standard wash water comprised of hot, distilled water in a standard volume sufficient to remove substantially all dissolved materials associated with the filter cake. The filter cakes are then dried and weighed to determine the yield of alumina trihydrate crystals. The alumina trihydrate crystal particle size distribution was characterized by determining the weight percentages of the dry filter cakes that have particle sizes greater than, and smaller than, 325 mesh and 200 mesh, that is, the weight percent of the filter cake particles that did not pass through, and did pass through, a standard mesh screen of the respective size.

EXAMPLE 1

The Test Method described above was employed to demonstrate the trihydrate crystal modifier performance of a representative hydroxamated polymer according to the present invention. The polymer was an anionic, water-soluble terpolymer comprised of acrylic acid, acrylamide, and acrylhydroxamic mer units in the approximate mole ratios of 2:1:1, derived from the hydroxamation of a high molecular weight acrylic acid/acrylamide copolymer. The weight average molecular weight of the hydroxamated polymer was about 10,000,000. The polymer dosages employed were 2 and 4 mg of polymer actives per liter of the pregnant liquor, and the polymer was added to the pregnant liquor in each instance as a dilute aqueous solution. Two blanks or controls in which no trihydrate crystal modifier was used were also run as a comparison. The pregnant liquor employed for all test samples contained an $Al_2O_3$ content of 156 grams per liter of pregnant liquor. The same alumina trihydrate seed was used for all test samples, and 65.2 weight percent of such seed was greater than 325 mesh and 28.2 weight percent of such seed was greater than 200 mesh. The remaining test parameters are the standard test parameters set forth above in the Test Method Description. The test results, in terms of product yield per volume of pregnant liquor and the particle size distribution characterizations of the product, are set forth below in Table 1. The particle size distribution characteristics are given in terms of the weight percentages of the product greater than 325 and 200 mesh, and also the percent reduction in particles of less than 325 mesh in comparison to the blanks.

TABLE 1

| Dosage of Crystal Modifier (mg/liter) | Product Yield (grams $Al_2O_3$ per liter) | Weight % Product > 325 Mesh | Weight % Product > 200 Mesh | Percent Reduction of < 325 Mesh Product |
|---|---|---|---|---|
| none | 47.6 | 94.6 | 38.9 | — |
| none | 49.1 | 93.2 | 33.8 | — |
| 2 | 48.4 | 96.4 | 44.2 | 41 |
| 4 | 49.2 | 97.2 | 46.8 | 54 |

As seen from Table 1, while the product yields of the test samples treated with the hydroxamated polymer crystal modifier were the same as the blanks, the weight percentages of the products having particle sizes greater than 325 mesh and 200 mesh increased over that of the blanks, and the weight percentages of the products having particles sizes of less than 325 mesh and 200 mesh decreased. For these performance calculations, the blanks were averaged. The dosages of the hydroxamated polymer crystal modifier employed in relation to the $Al_2O_3$ content of pregnant liquor were 12.8 and 25.6 ppm.

The hydroxamated polymer employed in the present invention is, as noted above, a water soluble polymer. The water solubility characteristics of the hydroxamated polymer preferably is defined in terms of the fluidity of its aqueous solutions. By "water soluble" is meant herein, and generally, that an aqueous solution of the polymer, at the polymer actives concentration at which it is charged to the pregnant liquor, is reasonably fluid, and preferably has a viscosity of no more than about 5,000 to 20,000 cps Brookfield, at a pH of between about 6 and about 14, and ambient room temperature (from about 23 to about 26° C.). The addition of the hydroxamated polymer in the form of a dilute aqueous solution facilitates a rapid dispersion of the polymer in the pregnant liquor. Such aqueous solutions of the hydroxamated polymer should not be overly viscous, but they also should not be so dilute that unnecessary volume of water is added to the pregnant liquor. For most hydroxamated polymers, an aqueous solution containing from about 0.01 to about 2 weight percent of polymer actives is generally reasonable. To further facilitate the rapid dispersion of the hydroxamated polymer in the pregnant liquor, in preferred embodiment the polymer is added to the pregnant liquor as an alkaline aqueous solution, for instance having a pH of at least about 9, and more preferably at least about 10, up to about a pH of about 14.

We claim:

1. A process for the production of alumina trihydrate crystals comprising the steps of:
    mixing bauxite ore with water into a slurry;
    adding a caustic to the slurry to form an aqueous sodium aluminate solution comprising caustic-insoluble solids;
    separating the caustic-insoluble solids from the aqueous sodium aluminate solution so that the aqueous sodium aluminate solution comprises no more than about 10 mg of caustic-insoluble solids per liter; and
    adding a hydroxamated polymer to the aqueous aluminate solution after completion of the separating step.

2. The process of claim 1 wherein the aqueous sodium aluminate solution has a dissolved aluminate content, $Al_2O_3$, of from about 55 to about 300 grams per liter.

3. The process of claim 1 further comprising adding alumina trihydrate seed crystals to the aqueous solution after adding the hydroxamated polymer.

4. The process of claim 1 wherein the caustic comprises sodium hydroxide and the aqueous solution has an alkalinity of from about 5 to about 400 grams per liter, expressed as sodium carbonate.

5. The process of claim 1 further comprising precipitating alumina trihydrate crystals from the aqueous solution.

6. The process of claim 5 wherein at least half of the precipitated crystals by weight exceed 325 mesh.

7. The process of claim 1 wherein the hydroxamated polymer is added to the aqueous sodium aluminate solution in an amount within the range of from about 0.01 to about 20 mg per liter.

8. The process of claim 1 wherein the amount of the hydroxamated polymer added to the aqueous sodium aluminate solution is in the range from about 0.05 to about 125 parts by weight of the hydroxamated polymer per million parts by weight of alumina, as $Al_2O_3$ in the aqueous sodium aluminate solution.

9. The process of claim 1 wherein the hydroxamated polymer is a polymer containing mer units of the Formula I

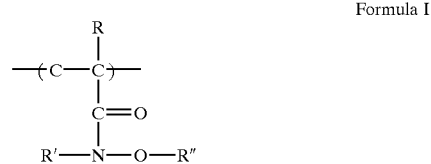

Formula I wherein R is hydrogen or a substituent to carbon other than hydrogen, and R' and R" are independently hydrogen, a cation or a substituent other than hydrogen or a cation.

10. The process of claim 1 wherein the hydroxamated polymer has an average molecular weight within the range of from about 10,000 to about 50,000,000.

11. The process of claim 1 wherein the hydroxamated polymer has an average molecular weight of at least 1 million.

12. The process of claim 1 wherein the hydroxamated polymer has an Intrinsic Viscosity of from about 5 to about 40 dl/g.

13. The process of claim 1 wherein the hydroxamated polymer is comprised of from about 25 to about 75 mole percent anionic mer units other than hydroxamic mer units, the balance being hydroxamic mer units or hydroxamic mer units together with nonionic mer units.

14. The process of claim 1 wherein the hydroxamated polymer is comprised of from about 25 to about 75 mole percent anionic mer units other than hydroxamic mer units, from about 10 to about 40 mole percent hydroxamic mer units and from about 10 to about 40 mole percent nonionic mer units.

15. A process for the production of alumina trihydrate crystals comprising the steps of:

mixing bauxite ore with water into a slurry;

adding a caustic to the slurry to form an aqueous sodium aluminate solution comprising caustic-insoluble solids;

separating the caustic-insoluble solids from the aqueous sodium aluminate solution;

precipitating alumina trihydrate crystals out of the aqueous sodium aluminate solution; and adding a hydroxamated polymer to the aqueous sodium aluminate solution after the precipitating step has commenced.

16. The process of claim 15 wherein at the time when the hydroxamated polymer is added, the aqueous sodium aluminate solution has a dissolved alumina content, as $Al_2O_3$, of from about 55 to about 300 grams per liter.

17. The process of claim 15 wherein the caustic comprises sodium hydroxide and the amount of the hydroxamated polymer added to aqueous sodium aluminate solution is in the range of from 0.01 to about 20 mg per liter of the aqueous sodium aluminate solution.

18. The process of claim 15 wherein the aqueous sodium aluminate solution has no more than 10 mg of the caustic insoluble solids per liter.

19. The process of claim 15 wherein the hydroxamated polymer has an Intrinsic Viscosity of from about 5 to about 40 dl/g and is comprised of from about 25 to about 75 mole percent anionic mer units other than hydroxamic mer units, the balance being hydroxamic mer units, optionally together with nonionic mer units.

20. A method of producing alumina trihydrate crystals comprising the steps of:

mixing bauxite ore with water into a slurry;

adding a caustic to the slurry to form an aqueous aluminate solution comprising caustic-insoluble solids;

separating the caustic-insoluble solids from the aqueous sodium aluminate solution;

adding alumina trihydrate seed crystals to the aqueous sodium aluminate solution; and adding a hydroxamated polymer to the aqueous sodium aluminate solution.

21. The method of claim 20 wherein the aqueous sodium aluminate solution contains no more than about 50 mg of insoluble suspended solids per liter of the aqueous sodium aluminate solution.

22. The method of claim 20 wherein the hydroxamted polymer has an average molecular weight within the range of from more than 10,000 to about 50,000,000.

23. The method of claim 20 further comprising adding the hydroxamated polymer to the aqueous sodium aluminate solution before alumina trihydrate seed crystals have been charged into aqueous solution to facilitate precipitation of alumina trihydrate crystals.

* * * * *